(12) United States Patent
Suzuki et al.

(10) Patent No.: US 9,389,957 B2
(45) Date of Patent: Jul. 12, 2016

(54) MEMORY CONTROLLER, MEMORY SYSTEM, AND MEMORY CONTROL METHOD

(71) Applicant: Kabushiki Kaisha Toshiba, Minato-ku (JP)

(72) Inventors: Riki Suzuki, Yokohama (JP); Toshikatsu Hida, Yokohama (JP); Osamu Torii, Setagaya-ku (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 238 days.

(21) Appl. No.: 14/162,914

(22) Filed: Jan. 24, 2014

(65) Prior Publication Data

US 2015/0067438 A1    Mar. 5, 2015

Related U.S. Application Data

(60) Provisional application No. 61/872,935, filed on Sep. 3, 2013.

(51) Int. Cl.
*G11C 29/00* (2006.01)
*G06F 11/10* (2006.01)

(52) U.S. Cl.
CPC ........ *G06F 11/1068* (2013.01); *G06F 11/1072* (2013.01)

(58) Field of Classification Search
CPC .. G06F 11/1068; G06F 11/1072; G06F 11/08
See application file for complete search history.

(56) References Cited

U.S. PATENT DOCUMENTS

| 7,900,117 | B2 | 3/2011 | Kanno |
| 8,006,165 | B2 | 8/2011 | Yoshida |
| 8,555,143 | B2 * | 10/2013 | Chung ................. G06F 11/1068 714/773 |
| 8,726,140 | B2 * | 5/2014 | Chang ................. G06F 11/1068 714/800 |
| 2012/0151294 | A1 | 6/2012 | Yoo et al. |
| 2012/0173955 | A1 * | 7/2012 | Liang .................. G06F 11/1048 714/773 |

* cited by examiner

*Primary Examiner* — Shelly A Chase
(74) *Attorney, Agent, or Firm* — Oblon, McClelland, Maier & Neustadt, L.L.P.

(57) ABSTRACT

According to one embodiment, a memory controller that controls non-volatile memory including a data area and a parity area in which parity for data of a fixed length to be stored in the data area is stored, the memory controller including a coding unit configured to generate parity for each of two or more partial data, each of which has a length less than the fixed length, and the memory controller writing one of the parity generated by the coding unit onto the parity area as first parity, writing the partial data and second parity that is the parity, other than the first parity, generated by the coding unit, onto the data area as the data of the fixed length, and writing the second parity onto a position subsequent to the partial data corresponding to the second parity.

11 Claims, 5 Drawing Sheets

MEMORY CONTROLLER, MEMORY SYSTEM, AND MEMORY CONTROL METHOD

CROSS-REFERENCE TO RELATED APPLICATIONS

This application is based upon and claims the benefit of priority from Provisional Patent Application No. 61/872,935, filed on Sep. 3, 2013; the entire contents of which are incorporated herein by reference.

FIELD

Embodiments herein relate to a memory controller, a memory system, and a memory control method.

BACKGROUND

As a method of protecting data stored in a memory unit, such as NAND flash memory (hereinafter referred to as NAND memory), there is a method of using an Error Check and Correction code (ECC). According to this method, parity is generated on data by an error-correction coding, and the parity is written on the memory unit together with the data. During a reading process from the memory unit, the parity is read together with the data, and an error correction process is executed. In order to simplify hardware and a process, a size (ECC unit data) of data that is the subject to be protected by using one piece of parity is constant in general.

When the ECC unit data is constant, parity is not generated, if data that is to be written is written on the memory unit without having a data size of the ECC unit data. The data on which the parity is not generated cannot be restored, when error is generated on this data.

DETAILED DESCRIPTION

In general, according to one embodiment, a memory controller controls non-volatile memory including a data area and a parity area in which parity for data of a fixed length to be stored in the data area is stored, the memory controller including a coding unit configured to generate parity for each of two or more partial data, each of which has a length less than the fixed length. The memory controller writes one of the parity generated by the coding unit onto the parity area as a first parity, writes the partial data and a second parity that is the parity, other than the first parity, generated by the coding unit, onto the data area; and writes the second parity onto a position subsequent to the partial data corresponding to the second parity.

Exemplary embodiments of a memory controller, a memory system, and a memory control method will be explained below in detail with reference to the accompanying drawings. The present invention is not limited to the following embodiments.

Figure 1:
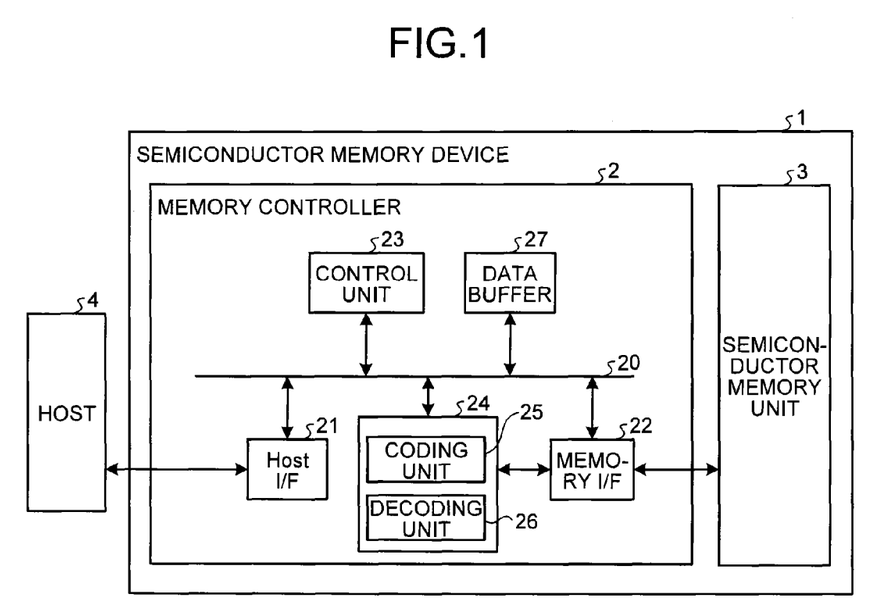
FIG. 1 is a block diagram illustrating an example of a configuration of a semiconductor memory device according to a first embodiment.

FIG. 1 is a block diagram illustrating an example of a configuration of a semiconductor memory device (memory device) according to an embodiment. A semiconductor memory device 1 according to the present embodiment includes a memory controller 2, and a semiconductor memory unit (non-volatile memory) 3. The semiconductor memory device 1 is connectable to a host 4. FIG. 1 illustrates that the semiconductor memory device 1 is connected to the host 4. The host 4 is an electric device such as a personal computer or a mobile terminal.

The semiconductor memory unit 3 is non-volatile memory that stores data in a non-volatile manner, and it is NAND memory, for example. In this embodiment, NAND memory is used as the semiconductor memory unit 3. However, a storage unit other than the NAND memory can be used as the semiconductor memory unit 3. In this embodiment, a semiconductor memory is used as the memory unit. However, an error-correction coding according to the present embodiment can be applied to a memory device using a memory unit other than the semiconductor memory.

The memory controller 2 controls writing to the semiconductor memory unit 3 in accordance with a write command (request) from the host 4. The memory controller 2 also controls reading from the semiconductor memory unit 3 in accordance with a read command (request) from the host 4. The memory controller 2 includes a Host I/F 21, a memory I/F (Interface) 22, a control unit 23, a coding/decoding unit 24, and a data buffer 27. The coding/decoding unit 24 includes a coding unit 25 and a decoding unit 26. The Host I/F 21, the memory I/F 22, the control unit 23, the data buffer 27, the coding unit 25, and the decoding unit 26 are interconnected with an internal bus 20.

The Host I/F 21 executes a process with the host 4 according to an interface standard, and outputs a command or user data received from the host 4 to the internal bus 20. The Host I/F 21 transmits user data read from the semiconductor memory unit 3 or a response from the control unit 23 to the host 4.

The memory I/F 22 executes a process of writing write data onto the semiconductor memory unit 3 based upon an instruction from the control unit 23. The memory I/F 22 also executes a process of reading the data from the semiconductor memory unit 3 based upon the instruction from the control unit 23.

The control unit 23 generally controls each component in the semiconductor memory device 1. When receiving a command from the host 4 via the Host I/F 21, the control unit 23 executes control according to this command. For example, the control unit 23 instructs the memory I/F 22 to write the user data and the parity to the semiconductor memory unit 3 in accordance with the command from the host 4. The control unit 23 also instructs the memory I/F 22 to read the user data and the parity from the semiconductor memory unit 3 in accordance with the command from the host 4.

The user data transmitted from the host 4 is transferred to the internal bus 20, and stored in the data buffer 27. The coding unit 25 executes error-correction coding to generate parity based upon the user data stored in the data buffer 27 as described later.

The decoding unit 26 executes a decoding process based upon the user data and the parity read from the semiconductor memory unit 3. When the user data has no error, the decoding unit 26 outputs the user data read from the semiconductor memory unit 3 to the internal bus 20 as it is. When the user data has an error, the decoding unit 26 executes an error correction according to the error correction process, and then, outputs the user data to the internal bus 20.

The data buffer 27 temporarily stores the data received by the memory controller 2 from the host 4 until it is stored in the semiconductor memory unit 3. The data buffer 27 also temporarily stores the data read from the semiconductor memory unit 3 until it is transmitted to the host 4. The data buffer 27 is composed of a general-purpose memory such as SRAM (Static Random Access Memory) or DRAM (Dynamic Random Access Memory).

In the present embodiment, the semiconductor memory unit 3 stores parity together with data. With this, the data stored in the semiconductor memory unit 3 is protected. In the present embodiment, the decoding unit 26 executes a decoding process on the assumption that the ECC unit data is constant. With this, the hardware and process of the decoding unit 26 can be simplified.

Figure 2:
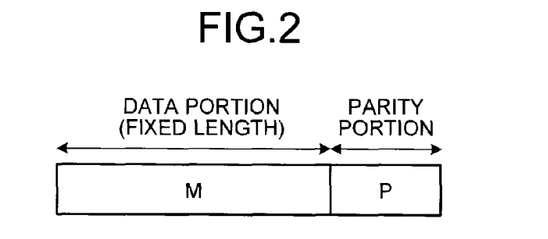
FIG. 2 is a view illustrating one example of a storage format to a semiconductor memory unit according to the first embodiment.

FIG. 2 is a view illustrating one example of a storage format to the semiconductor memory unit 3 according to the present embodiment. As illustrated in FIG. 2, data M is stored in a data portion (data area) with a fixed length (ECC unit data) in the semiconductor memory unit 3. The coding unit 25 executes the error-correction coding to the data M with the fixed length stored in the data portion, thereby generating parity P. The parity P is stored in a parity portion (parity area) with a fixed length in the semiconductor memory unit 3. In the error-correction coding used in the present embodiment, any code (block code) can be used, so long as it can separate data and parity. For example, BCH code or RS (Reed Solomon) code can be used.

Next, the error-correction coding according to the present embodiment will be described. As described above, in the present embodiment, parity is generated for each data of the ECC unit data of the fixed length. However, there may be the case where the writing process is stopped in the state in which the data size is less than the ECC unit data. Examples of such situation include a case in which a flash command that is a command to instruct that the writing process is forcibly performed upon a power shutdown is received. As a method of writing data of less than the ECC unit data onto the semiconductor memory unit 3 and generating parity for the data, there is a method of writing 0 on the remaining memory area until the data size reaches the ECC unit data, when the flash command is received in the state in which the data size is less than the ECC unit data. When parity is generated by writing 0 on the remaining memory area, and this parity is written in the parity portion in the ECC unit data, the data of less than the ECC unit data can also be protected by the parity.

Figure 3:
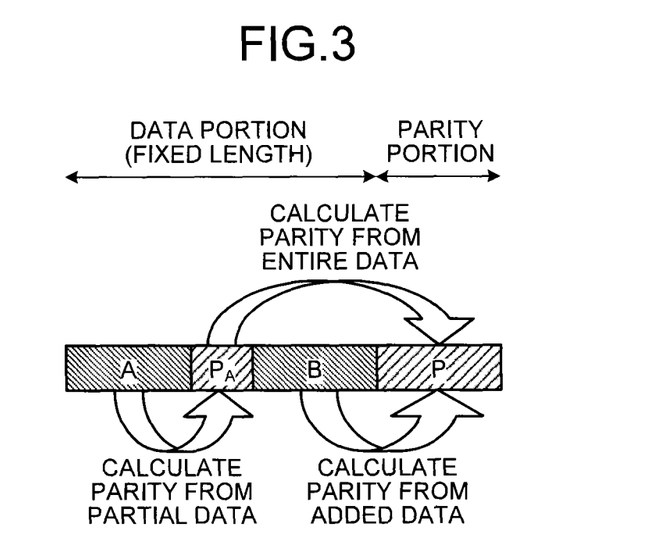
FIG. 3 is a view illustrating one example of data and parity according to the first embodiment.

However, in the method of writing 0 on the remaining memory area as described above, 0 is written on the corresponding area in the semiconductor memory unit 3, which means that the writing that is originally unnecessary is carried out to the semiconductor memory unit 3. This adversely affects the semiconductor memory unit 3. On the other hand, in the present embodiment, parity is generated to data of less than the ECC unit data. The parity is written after the data of less than the ECC unit data, and write data is written subsequent to the parity. With this, the data partially written is protected, and unnecessary writing of 0 can be reduced. The data can be written to be filled in the portion where 0 is inserted, so that the writing efficiency to the semiconductor memory unit 3 can be enhanced. FIG. 3 is a view illustrating one example of data and parity according to the present embodiment. FIG. 3 illustrates the state in which data and parity are finally written onto the semiconductor memory unit 3. In the present embodiment, the error-correction coding process is executed to partial data A of less than the ECC unit data to generate parity $P_A$ as illustrated in FIG. 3. The $P_A$ is then stored in the data portion. Similarly, the error-correction coding process is executed to partial data B of less than the ECC unit data to generate parity $P_B$. In FIG. 3, the parity $P_B$ is stored in the parity portion as the parity P. The parity written on the parity portion is specified as a first parity, while the parity written on the data portion is specified as a second parity. In the present embodiment, the first parity is specified as the last parity generated by the error-correction coding process. In the example in FIG. 3, there are two partial data A and B. Therefore, the parity $P_B$ to the last partial data B is stored in the parity portion. When there are three or more partial data, parity for the last partial data is similarly stored in the parity portion.

In order to decode the data, the decoding process is only executed by using the parity stored in the parity portion and the data (actually including the parity) stored in the data portion, as in the case of decoding the data and the parity stored in the format illustrated in FIG. 2. When the data and the parity stored in the format illustrated in FIG. 2 are decoded, the decoding process is executed by treating the data stored in the data portion as an information portion and treating the parity stored in the parity portion as a redundant portion. Similarly, when the data illustrated in FIG. 3 is decoded, the decoding process is executed by treating the data (actually including the parity) stored in the data portion as an information portion and treating the parity stored in the parity portion as a redundant portion. The reason why the decoding process can be executed as the normal process (the process of decoding the data and the parity stored in the format illustrated in FIG. 2) is because, in FIG. 3, the parity P (=$P_B$) stored in the parity portion matches the parity for "partial data A+parity $P_A$+partial data B" stored in the data portion.

Figure 4:
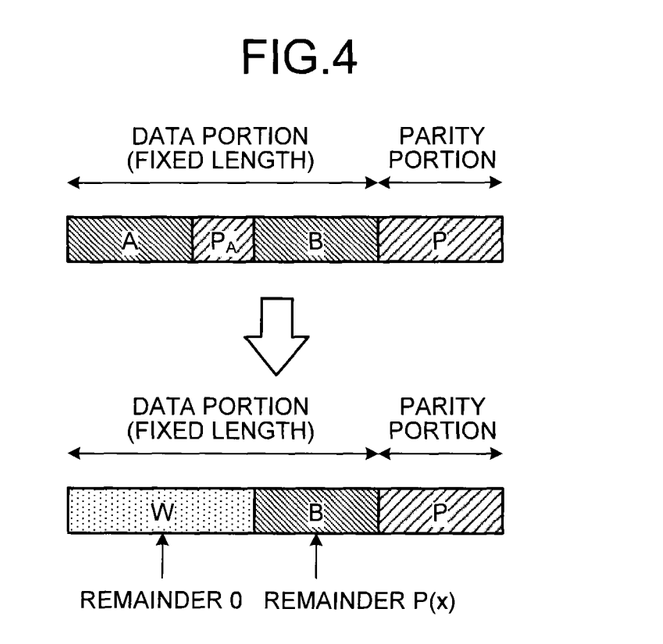
FIG. 4 is a view for describing parity of entire data.

It will be proved below that the parity for the last partial data becomes equal to the parity of the entire data. FIG. 4 is a view for describing parity of entire data. The partial data A+parity $P_A$ to the partial data A is specified as a codeword W (W(x) in a polynomial expression).

A generator polynomial G(x) used in the error-correction coding process by the coding unit 25 is specified as G(x). The following equation (1) is established by specifying the quotient upon the division of W(x) by the generator polynomial G(x) as $Q_W(x)$.

$$W(x) = Q_W(x) \times G(x) \qquad (1)$$

The following equation (2) is established by specifying the quotient upon the division of B(x), which is a polynomial expression of the partial data B, by the generator polynomial G(x) as $Q_B(x)$.

$$B(x) = Q_B(x) \times G(x) \qquad (2)$$

From the equations (1) and (2) described above, W(x)+B(x) can be expressed by the following equation (3).

$$W(x)+B(x) = Q_W(x) \times G(x) + Q_B(x) \times G(x) + P(x) = (Q_W(x) + Q_B(x))G(x) + P(x) \qquad (3)$$

Accordingly, the remainder upon the division of W(x)+B(x) by the generator polynomial G(x) becomes equal to the remainder P(x) upon the division of B(x) by the generator polynomial G(x). The case where there are two partial data has been described above. In the case where there are three or more data, the remainder of the last partial data becomes equal to the remainder of the entire data portion, if parity is generated for each partial data, and the parity is stored after each data except for the last data.

It is noted that the generator polynomials are made equal between the case of generating parity for the entire data and the case of generating parity for each partial data. If the size of the parity for each partial data is made equal to the size of the parity portion, the hardware of the coding unit 25 can be simplified.

In the description above, the error-correction coding process according to the present embodiment is described by using the state in which the data is finally written onto the semiconductor memory unit 3. The writing method of writing data to the semiconductor memory unit 3 will next be described. When data is written onto the semiconductor memory unit 3 in the format illustrated in FIG. 3, for example, it is considered that one ECC unit data data and corresponding parity are collectively written. In this case, the subject to be stored in the data portion (e.g., the partial data A, the parity $P_A$, and the partial data B illustrated in FIG. 3) is all held in the data buffer 27 until the parity that is to be stored in the parity portion is generated. When no restriction is imposed on a unit upon writing to the semiconductor memory unit 3, i.e., when data can be written with any data size unit, it is considered that the data is written on the semiconductor memory unit 3 every time the parity for the partial data is generated. In FIG. 3, for example, when the parity $P_A$ is generated, the partial data A and the parity $P_A$ are written on the semiconductor memory unit 3. After the parity to be stored in the parity portion is generated, the partial data B and the parity P are written on the semiconductor memory unit 3. In this way, the data is written in two stages.

On the other hand, when the NAND memory is used as the semiconductor memory unit 3, the writing process is performed in a constant writing data unit (minimum writing data unit) generally called a page. The operation of generating parity and writing operation to the semiconductor memory unit 3 when the writing process is performed in a page unit will be described below.

Figure 5:
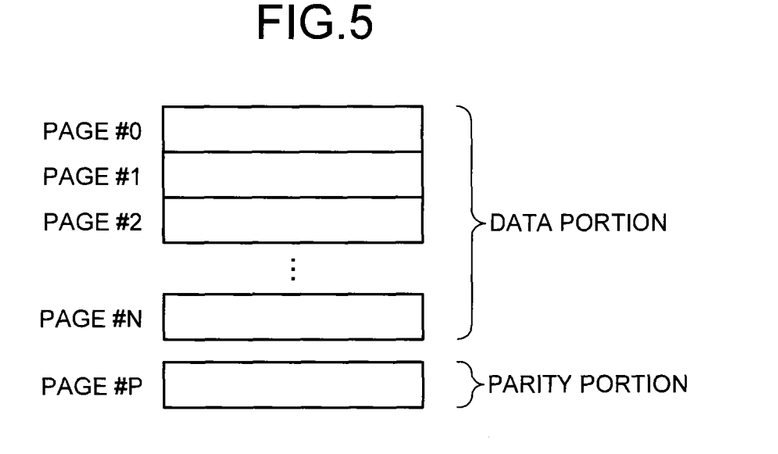
FIG. 5 is a view illustrating one example of write data written on the semiconductor memory unit, when an ECC unit data is composed of plural pages.

The present embodiment describes the case where the ECC unit data is composed of plural pages (where data of one ECC unit data is stored in plural pages of the semiconductor memory unit 3). FIG. 5 is a view illustrating one example of write data written on the semiconductor memory unit 3, when the ECC unit data is composed of plural pages. In FIG. 5, data stored in N (N is an integer not less than 0)+one page is specified as the ECC unit data. In FIG. 5, page #0 to page #N are specified as the data portion (data area), while page #P is specified as the parity portion (parity area). The data stored in the data portion in FIG. 5 may be the user data itself transferred from the host 4, or may be the user data transferred from the host 4 and the parity (e.g., the parity generated to the user data stored in one page) corresponding to the user data.

When the data is stored in the semiconductor memory unit 3 in the format illustrated in FIG. 5, parity is not determined until all data of ECC unit data is inputted in the conventional error-correction coding process. Therefore, when the writing process is ended by a flash command without the preparation of the data of the ECC unit data, the process of writing 0 (0 padding) on the portion less than the ECC unit data is executed in order to protect the data of less than the ECC unit data with the parity. This process unnecessarily uses the semiconductor memory unit 3. The parity is not determined when the data is less than the ECC unit data. Therefore, the parity is not stored in the semiconductor memory unit 3, so that the data not protected by the ECC is generated. In the present embodiment, parity is generated for partial data, and the parity for the partial data is stored in the data portion as described above. This process allows effective use of the semiconductor memory unit 3, and can reduce the data not protected by the ECC.

When the ECC unit data is composed of plural pages, a first method and a second method are considered as the writing method to the semiconductor memory unit 3. The first method is such that the data transferred from the host 4 is held in the data buffer 27 until it has the data size of the ECC unit data, and after parity is generated for the data of the ECC unit data, the data and the parity are collectively written in the NAND memory. In the first method, the writing to the NAND memory is not performed until the data of the ECC unit data is stored in the data buffer 27.

The second method is such that data is written on the semiconductor memory unit 3 in a page unit, and the data is sequentially inputted to the coding unit 25 in the page unit. The second method can increase the writing speed more than in the first method. In the second method, the data is halfway inputted to the coding unit 25, until the data that is to be stored on the last page in the ECC unit data is inputted. Parity is determined when the entire data of the ECC unit data is inputted. The determined parity is stored in the NAND memory.

Figure 6:
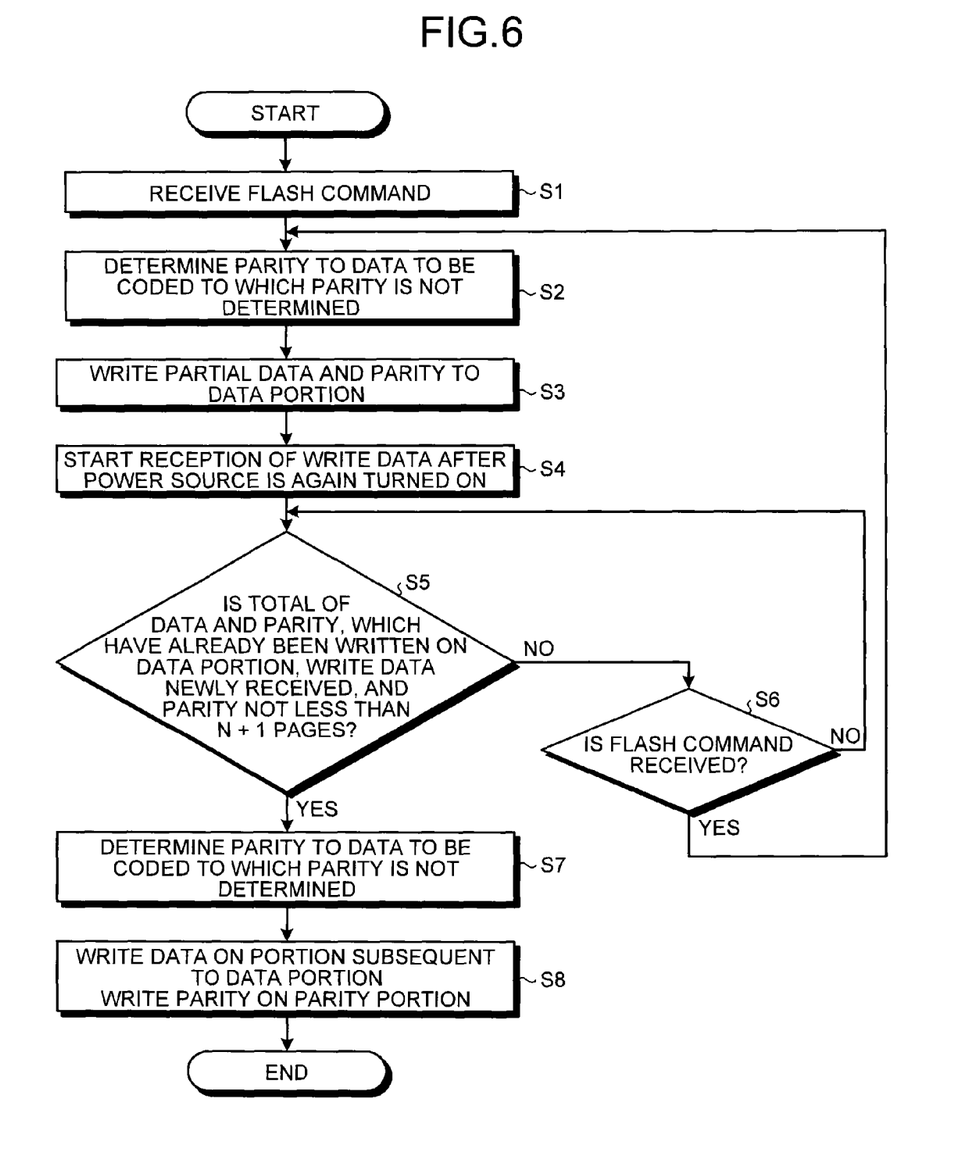
FIG. 6 is a flowchart illustrating one example of a writing process to the semiconductor memory unit according to a second method.

As one example, the present embodiment describes a writing process to the semiconductor memory unit 3, when a flash command is received in the case where the first method is employed for the writing process. FIG. 6 is a flowchart illustrating one example of the writing process to the semiconductor memory unit 3 when the flash command is received. FIG. 6 illustrates the process of writing data in one ECC unit data.

The control unit 23 decides the writing position (page) on the semiconductor memory unit 3 for the first unit (the size of the data to be stored in one page) for the data to be stored in the data buffer 27. The control unit 23 holds the correspondence between the data in the first unit in the data buffer 27 (the storage address of the data in the first unit on the data buffer 27) and the storage page (storage address) on the semiconductor memory unit 3. Specifically, the control unit 23 determines a physical data portion (data area) and a parity portion (parity area) on the semiconductor memory unit 3.

When the control unit 23 receives the flash command with the state in which the size of the data stored in the data buffer 27 is less than one ECC unit data (step S1), the control unit 23 instructs the coding unit 25 to determine parity to the data to be coded to which the parity is not determined (step S2). Specifically, the control unit 23 instructs the coding unit 25 to generate and output parity based upon the data stored in the data buffer 27. The coding unit 25 generates parity based upon the data stored in the data buffer 27 in accordance with the instruction from the control unit 23. Then, the control unit 23 instructs the memory I/F 22 to write the partial data (the data stored in the data buffer 27) and the parity to the data portion on the semiconductor memory unit 3 (step S3). The memory I/F 22 writes the parity determined in step S2 on the data portion of the semiconductor memory unit 3 in accordance with the instruction from the control unit 23. Thereafter, the power source of the semiconductor memory device 1 is turned off.

After the power source of the semiconductor memory device 1 is turned on again, the memory controller 2 starts the reception of write data from the host 4 (step S4). The control unit 23 determines whether the total of the data and the parity, which have already been written on the data portion of the semiconductor memory unit 3, write data newly received (after the power source is again turned on), and parity to be written on the parity portion is not less than N+1 pages or not (step S5). When the total of the data and the parity, which have already been written on the data portion, write data newly received, and parity to be written on the parity portion is not less than N+1 pages, (step S5, Yes), the control unit 23 instructs the coding unit 25 to determine parity to the data to be coded to which parity is not determined (step S7). Specifically, the control unit 23 instructs the coding unit 25 to generate and output a parity based upon the data (write data newly received) stored in the data buffer 27.

Then, the control unit 23 instructs the memory I/F 22 to write the data (the data stored in the data buffer 27) to the data portion of the semiconductor memory unit 3, and to write the parity to the parity portion of the semiconductor memory unit 3 (step S8). The memory I/F 22 writes the data (the data stored in the data buffer 27) on the data portion of the semiconductor memory unit 3, and writes the parity determined in step S7 to the parity portion of the semiconductor memory unit 3, according to the instruction from the control unit 23.

When the total of the data and the parity, which have already been written on the data portion, write data newly received (after the power source is again turned on), and a parity to be written on the parity portion is less than N+1 pages in step S5 (step S5, No), the control unit 23 determines whether the flash command is received or not (step S6). When the flash command is received (step S6, Yes), the control unit 23 returns to step S2. When the flash command is not received (step S6, No), the control unit 23 returns to step S5.

Figure 7:
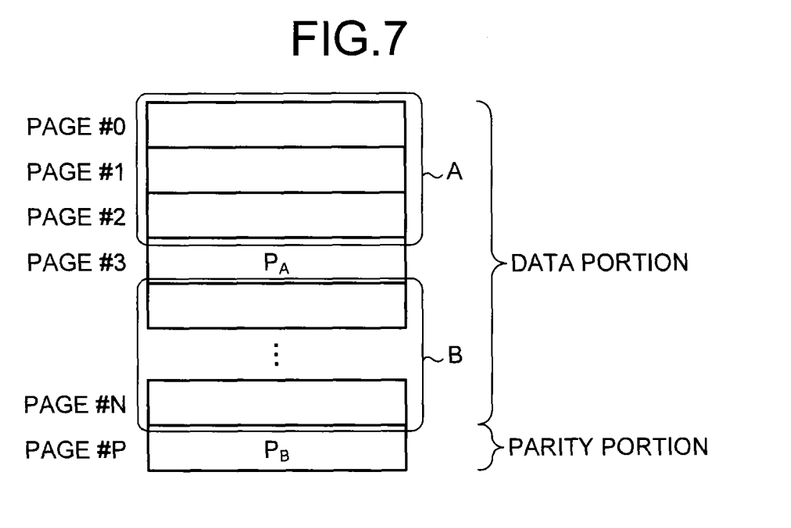
FIG. 7 is a view illustrating one example of writing data and parity on the semiconductor memory unit, when an ECC unit data is composed of plural pages.

FIG. 7 is a view illustrating one example of writing data and parity on the semiconductor memory unit 3, when an ECC unit data is composed of plural pages. Partial data A in FIG. 7 corresponds to the partial data A in FIG. 3, and partial data B in FIG. 7 corresponds to the partial data B in FIG. 3. Parity $P_A$ in FIG. 7 corresponds to the parity $P_A$ in FIG. 3, and parity $P_B$ in FIG. 7 corresponds to the parity P ($=P_B$) in FIG. 3. In this case, parity for one page is supposed to be generated to the data portion of N+1 pages.

When the writing process is forcibly ended by the flash command, the data is halfway written in the ECC unit data. In FIG. 7, when the flash command is received at the point when the partial data A is written, the partial data A and the parity $P_A$ are stored. When the memory device is again started, and the writing is executed after the flash command, the data can be written as the partial data B subsequent to the partial data A+parity $P_A$, i.e., after a page #4 in FIG. 7, in order to effectively utilize the semiconductor memory unit 3.

As described above, in the present embodiment, parity is generated for each of plural partial data of less than the ECC unit data. The parity that is last generated, out of the generated plural parity, is stored in the parity portion, while the other parity is stored on the position subsequent to the partial data based upon which the corresponding parity is generated. Accordingly, the data storage efficiency of the semiconductor memory unit 3 can be enhanced, as well as data that is not protected by the ECC can be reduced. The entire data can be protected by the parity generated from the data that is last added, whereby a writing process can efficiently be performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller that controls non-volatile memory including a data area and a parity area in which parity for data of a fixed length to be stored in the data area is stored, the memory controller comprising:
   a coding unit configured to generate parity for each of two or more partial data, each of which has a length less than the fixed length;
   a control unit configured to write one of the two or more parity generated by the coding unit onto the parity area as first parity, to write at least one of the two or more partial data and second parity that is the parity, other than the first parity, generated by the coding unit, onto the data area as the data of the fixed length, and to write the second parity onto a first position subsequent to a second position, the second position being a position in which one of the two or more partial data corresponding to the second parity is stored; and
   a memory interface configured to write at least one of the two or more partial data, the second parity, and the first parity onto the non-volatile memory according to the control from the control unit.

2. The memory controller according to claim 1, further comprising:
   a decoding unit configured to perform an error correction process, wherein
   the memory controller reads at least one of the two or more partial data and the second parity stored in the data area, and the first parity stored in the parity area from the non-volatile memory, and
   the decoding unit executes the error correction process by specifying at least one of the two or more partial data and the second parity read from the non-volatile memory as data to be corrected by the error correction process, and by specifying the first parity as parity in the error correction process.

3. The memory controller according to claim 1, wherein writing is performed to the non-volatile memory in a page unit, and
   the data of the fixed length is specified as data of plural pages stored in the non-volatile memory.

4. The memory controller according to claim 3, wherein when receiving a command to instruct that the writing is forcibly performed in the case where a size of user data to be written on the non-volatile memory is less than the fixed length, the coding unit executes an error correction coding process to the user data to be written on the non-volatile memory to generate the second parity, and the control unit controls to write the generated second parity onto the non-volatile memory, and then, ends the writing process.

5. A memory system comprising:
   non-volatile memory including a data area and a parity area that stores parity for data of a fixed length to be stored in the data area;
   a coding unit configured to generate parity for data that is to be written on the non-volatile memory;
   a control unit configured to write parity generated to first data, which is less than the fixed length, by the coding unit on a position of the data area subsequent to the first data as first parity, when the first data is written on the non-volatile memory, and when receiving an instruction of writing second data, in which the total size of the first data, the first parity, and third data that is a part of second data is equal to the fixed length, onto the non-volatile memory, the control unit is configured to write the third data on a first position of the data area subsequent to a second position of the data area, the second position being the position in which the first parity is stored, and to write parity generated to the third data by the coding unit on the parity area as second parity, wherein a value of the second parity is equal to a value of parity generated for the first data, the first parity, and the third data by the coding unit.

6. The memory system according to claim 5, wherein writing is performed on the non-volatile memory in a page unit, and the size of the fixed length is a size of multiple of the page unit.

7. The memory system according to claim 5, wherein the first data and the first parity are written on the non-volatile memory, when a flash command, which is a command to instruct that the writing is forcibly performed, is received.

8. A memory control method for controlling non-volatile memory including a data area and a parity area in which parity for data of a fixed length to be stored in the data area is stored, the memory control method comprising:

generating parity for each of two or more partial data, each of which has a length less than the fixed length;

writing one of the parity generated by the coding unit onto the parity area as first parity;

writing at least one of the two or more partial data and second parity that is the parity, other than the first parity, generated by the coding unit, onto the data area as the data of the fixed length; and writing the second parity onto a first position subsequent to a second position, the second position being a position in which at least one of the two or more partial data corresponding to the second parity is stored.

9. The memory control method according to claim 8, comprising:

Reading at least one of the two or more partial data and the second parity, which are stored in the data area, and the first parity stored in the parity area from the non-volatile memory; and executing an error correction process by specifying at least one of the two or more partial data and the second parity read from the non-volatile memory as data to be corrected by the error correction process, and by specifying the first parity as parity in the error correction process.

10. The memory control method according to claim 9, wherein writing is performed to the non-volatile memory in a page unit, and the data of the fixed length is specified as data of plural pages stored in the non-volatile memory.

11. The memory control method according to claim 10, wherein when a command to instruct that the writing is forcibly performed in the case where a size of user data to be written on the non-volatile memory is less than the fixed length is received, an error-correction coding process is executed to the user data to be written on the non-volatile memory to generate the second parity, the generated second parity is controlled to be written onto the non-volatile memory, and then, the writing process is ended.

* * * * *